(12) United States Patent
Girola

(10) Patent No.: US 10,364,924 B2
(45) Date of Patent: Jul. 30, 2019

(54) CONNECTING ASSEMBLY FOR A CORRUGATED TUBE

(71) Applicant: Fränkische Industrial Pipes GmbH & Co. KG, Königsberg (DE)

(72) Inventor: Andreas Enrico Girola, Pfäffikon ZH (CH)

(73) Assignee: Fränkische Industrial Pipes GmbH & Co. KG, Königsberg (DE)

( * ) Notice: Subject to any disclaimer, the term of this patent is extended or adjusted under 35 U.S.C. 154(b) by 174 days.

(21) Appl. No.: 15/512,861

(22) PCT Filed: Sep. 21, 2015

(86) PCT No.: PCT/EP2015/071564
§ 371 (c)(1),
(2) Date: Mar. 21, 2017

(87) PCT Pub. No.: WO2016/046114
PCT Pub. Date: Mar. 31, 2016

(65) Prior Publication Data
US 2017/0292644 A1 Oct. 12, 2017

(30) Foreign Application Priority Data
Sep. 22, 2014 (DE) .................. 10 2014 219 076

(51) Int. Cl.
*F16L 37/091* (2006.01)
*F16L 25/00* (2006.01)
(52) U.S. Cl.
CPC ....... *F16L 25/0045* (2013.01); *F16L 25/0054* (2013.01); *F16L 37/091* (2013.01)
(58) Field of Classification Search
CPC .................................................. F16L 37/091
(Continued)

(56) References Cited

U.S. PATENT DOCUMENTS 4,368,904 A * 1/1983 Lanz .................. F16L 25/0045
285/149.1
4,723,796 A * 2/1988 Nattel ................ F16L 25/0045
285/140.1
(Continued)

FOREIGN PATENT DOCUMENTS

DE 3939052 5/1991
DE 102005026576 12/2006
(Continued)

OTHER PUBLICATIONS

International Search Report of PCT/EP2015/071564 dated Nov. 30, 2015, 4 pages (English and German).
(Continued)

*Primary Examiner* — David Bochna
(74) *Attorney, Agent, or Firm* — Rankin, Hill & Clark LLP

(57) ABSTRACT

A connecting assembly (10) for connecting to a corrugated tube (12) includes a base body (14) with a receptacle recess (14*a*) for receiving the corrugated tube (12), and a latching unit (16) which can be introduced through a circumferential opening (14*c*) of the base body (14) into the receptacle recess (14*a*) and which has a latching element carrier (20) and a plurality of latching elements (22) constructed as one piece with the latching element carrier (20). The latching elements (22) are constructed for the purpose of engaging in a trough (12*b*) of the corrugated tube (12) and to resist a movement of the corrugated tube (12) out of the receptacle. The latching element carrier (20) is constructed as a split ring. The latching elements (22) are arranged uniformly distributed along the circumference of the latching element carrier (20).

19 Claims, 5 Drawing Sheets

(58) Field of Classification Search
USPC .......................................................... 285/903
See application file for complete search history.

(56) References Cited

U.S. PATENT DOCUMENTS

| | | | | |
|---|---|---|---|---|
| 4,904,000 | A * | 2/1990 | Matsui | H02G 3/0691 285/305 |
| 5,407,236 | A * | 4/1995 | Schwarz | F16L 25/0045 285/23 |
| 5,527,072 | A | 6/1996 | Norkey | |
| 5,632,512 | A * | 5/1997 | Guitoneau | F16L 25/0045 285/308 |
| 5,813,705 | A * | 9/1998 | Dole | F16L 37/148 285/305 |
| 6,254,145 | B1 * | 7/2001 | Schwarz | F16L 25/0045 285/319 |
| 6,367,802 | B1 * | 4/2002 | Knapp | F16L 21/03 277/314 |
| 6,464,263 | B1 * | 10/2002 | Schwarz | F16L 25/0045 285/305 |
| 6,478,342 | B1 * | 11/2002 | Berfield | A47L 9/242 285/275 |
| 7,431,343 | B2 * | 10/2008 | Chiu | F16L 25/0036 174/655 |
| 9,739,403 | B2 * | 8/2017 | Freter | F16L 37/091 |
| 10,082,230 | B2 * | 9/2018 | Dieduksman | F16L 21/06 |
| 2007/0246936 | A1 * | 10/2007 | Jeltsch | F16L 25/0045 285/319 |

FOREIGN PATENT DOCUMENTS

| | | |
|---|---|---|
| DE | 102011085398 | 5/2013 |
| EP | 0330350 | 8/1989 |
| EP | 0465896 | 1/1992 |
| EP | 1845299 | 10/2007 |
| JP | S59-39581 | 3/1984 |
| JP | S59-107401 | 6/1984 |
| JP | H09-152080 | 6/1997 |
| JP | 2007-292310 | 11/2007 |
| JP | 2014052023 | 3/2014 |
| WO | 9840656 | 9/1998 |

OTHER PUBLICATIONS

Search Report of DE Application No. DE 10 2014 219 076.2 dated Dec. 8, 2016, 8 pages.
Office Action of Japanese Serial No. 2017-535135 dated Mar. 18, 2019, 6 pages.
English translation of Office Action of Japanese Serial No. 2017-535135 dated Mar. 18, 2019, 7 pages.

* cited by examiner

CONNECTING ASSEMBLY FOR A CORRUGATED TUBE

BACKGROUND

The invention relates to a connecting assembly which is configured and intended for connecting to one end of a corrugated tube wherein the connecting assembly comprises a base body with a central passage which opens into a receptacle recess provided at one end of the base body, wherein the receptacle recess is configured to receive the corrugated tube which is introducible along an introducing direction and wherein the connecting assembly comprises a latching unit which is insertable through a circumferential opening of the base body in an inserting direction into the receptacle recess and which comprises a latching element carrier and a plurality of latching elements constructed as one piece with the latching element carrier, wherein the latching elements are configured and intended to engage in a trough of the corrugated tube and to resist a movement of the corrugated tube out of the receptacle against the introducing direction.

Such connecting assemblies are known, for example, from WO 1998/040 656 A1. According to a first variant disclosed in this document, the connecting assembly comprises two latching units, the latching element carriers of which are each configured to be circular arc-shaped and are pivotably articulated on the base body. This concept necessitates a complex and damage-prone construction of both the base body and also the latching units. In a second variant, the latching unit comprises a U-shaped latching element carrier, wherein the latching elements are provided only on the base limb of the U-shape. This variant is therefore unable to ensure a reliable connection between the base body and the corrugated tube.

BRIEF DESCRIPTION

In contrast, it is an object of the invention to provide a generic connecting assembly which is both simply constructed and also ensures a reliable connection of the base body and the corrugated tube, for example with regard to the tightness of the connection.

This object is achieved according to the invention with a generic connecting assembly in which the latching element carrier is configured as a slit ring and the latching elements are arranged evenly distributed along the circumference of the slit ring. In this way, it is firstly ensured that the corrugated tube is held by the latching unit on all sides. Secondly, only a single latching unit is required for this.

In a development of the invention, it is proposed that the latching elements are arranged along the circumference of the latching element carrier configured as a slit ring in a substantially gapless sequence. This embodiment is advantageous, for example, for the case that the machine or system, on which the connecting assembly according to the invention is built, is to be cleaned with a high pressure cleaning device. In this case, the latching elements which are arranged substantially without gaps so as to adjoin one another over the entire circumference of the slit ring can form a deflector wall which keeps the force of the impacting water away from the sealing means of the connecting assembly arranged therebehind in the introducing direction. These sealing means therefore still need only to seal against water that is present substantially at zero pressure. In this regard, reference is made to the standards group IP x9K, in particular the standard IP 69K, which contain test criteria for cleaning by means of a high pressure cleaning device at different pre-set angles.

The latching elements can fulfil the function of the deflector wall even better it with the exception of the latching elements arranged on either side of the slit, mutually adjacent latching elements are connected to one another by means of a membrane. Preferably, this membrane is formed from the same material as the latching elements, for example plastics material. The membranes are to be configured to be so thin that, on expansion of the latching elements resulting from the introduction of the corrugated tube, they can tear. However, not all the membranes need necessarily tear. Particularly in the portions adjacent to the slit of the slit ring, the latching elements need to expand less severely on introduction of the corrugated tube, since here the latching element carrier can also deflect elastically away from the introduced corrugated tube. The connections formed by the untorn membranes between mutually adjacent latching elements form a further seal which impedes the penetration of water. Advantageously, the membranes are less than 0.1 mm, preferably less than 0.05 mm thick.

In order to be able to prevent the latching unit from becoming independently released from the base body, it is proposed that the latching unit comprises at least one securing element which can be brought into a securing engagement with an associated countersecuring element of the base body securing the latching unit to the base body. Advantageously, this at least one securing element can be configured as a securing protrusion, whereas the countersecuring element can be configured as a securing recess, preferably as a securing opening penetrating the circumferential wall of the base body. In this case, in particular the configuration of the securing recess as a securing opening has the advantage that the production of the securing engagement can be visually checked. For this purpose, it is further advantageous if the material of the latching unit and the material of the base body have a colour contrast relative to one another.

As the above discussion of the latching unit reveals, it has different functions to fulfil, in addition to the secure holding of the corrugated tube, for example also the securing of its own hold on the base body. In order to be able to fulfil all these functions reliably, it is advantageous if the latching unit comprises a base element which is integrally connected to the latching element carrier.

For example, the at least one securing element can be formed on the base element.

Additionally or alternatively, the base element can have at least one guidance surface and the base body can have at least one counterguidance surface which, at the start of the insertion of the latching unit into the base body, can be brought into guiding engagement with one another and during the further insertion of the latching unit into the base body, slide over one another.

In a development of the invention, at least one guidance surface which, for example, is removed from the base body can be formed on the base body and cooperates with the at least one securing element. In this case, the guidance surface for the securing element can be configured, for example, to be substantially V-shaped, wherein the corresponding securing recess can be arranged at the tip of the V-shape, and wherein the V-shape can open as far as the circumferential opening in the base body. Furthermore, the V-shaped guidance surface can have a depth which decreases toward the tip of the V-shape. The cross section of the guidance surface can advantageously be adapted to a surface of the corresponding securing element coming into engagement with the guidance surface.

On introduction of the latching unit into the base body, the at least one securing element can come into engagement with the at least one guidance surface associated with it, advantageously at the widest and deepest point of the V-shape and can thus be guided, during the further introduction of the latching unit, to the securing recess associated with the securing element.

Additionally or alternatively, the base element can comprise at least one contact surface facing in the introducing direction and/or at least one contact surface facing against the introducing direction, which can each be brought into force-transmitting engagement with an associated counter-contact surface of the base body. In this case, the cooperation of the at least one contact surface facing in the introducing direction with the respectively associated countercontact surface can offer the resistance that is required in order, during the introduction of the corrugated tube into the connecting assembly, to be able to elastically deflect the latching elements of the latching unit inserted into the base body so far that the crests of the corrugated tube can move past the free ends of the latching elements. Once the corrugated tube has been completely inserted into the connecting assembly, the free ends of the latching elements pivot back under the effect of their own elasticity and engage in a trough of the corrugated tube. If an attempt is now made to pull the corrugated tube back out of the connecting assembly, then the latching elements are impinged upon in such a way that they engage more strongly into the trough of the corrugated tube. At the same time, the at least one contact surface of the latching unit directed against the introducing direction comes into force-transmitting engagement with the respectively associated countercontact surface of the base body. In this way, a non-destructive release of the corrugated tube from the connecting assembly is prevented. It should also be added that the direction specification "a surface faces in a particular direction" relates to the direction of the surface normal of this surface, which extends into the free space adjoining this surface.

In order to be able to reliably fulfil the functions described above, it is advantageous if the base element is configured to be U-shaped.

In order to be able to connect the base element mechanically robustly and resiliently to the latching element carrier, it is proposed that the base limb and preferably at least one of the side limbs, more preferably both side limbs of the U-shape are directly integrally connected to the latching element carrier. This is advantageous particularly with regard to the further conduction of the forces proceeding from the corrugated tube from the latching elements via the latching element carrier and further via the base element into the base body.

As previously indicated above, the at least one securing element can be arranged on the base element. Preferably it can be arranged on one of the side limbs of the U-shape.

Despite the fact that the base element is configured to be only U-shaped and thus, at least in the portions of the latching element carrier adjoining the slit, cannot directly conduct the forces proceeding from the corrugated tube to the base body, in order to still be able to provide a reliable force conduction in this region as well, in a development of the invention it is proposed that in the portions of the latching element carrier adjoining the slit on the side of the latching element carrier facing away from the latching elements, a plurality of contact elements facing against the introducing direction are provided which can be brought into force-transmitting engagement with an associated counter-contact surface of the base body. These contact elements assume the function in the angular region, over which the base element does not extend, of the contact surface of the base element directed against the introducing direction. Overall, therefore, there results an even force fit of the connection over the circumference of the tube.

In order to be able to ensure that the latching unit is inserted in the correct orientation into the base body in which the latching elements can exert a barbed effect on the corrugated tube inserted into the connecting assembly, it is proposed that provided on the base body is an orientation-assisting protrusion which protrudes into the circumferential opening, whilst on the latching unit, preferably on the base element of the latching unit, an associated orientation-assisting recess is provided. Through the cooperation of the orientation-assisting protrusion with the orientation-assisting recess, in addition to the twistproofing provided by the at least one securing element, a further protection against unwanted twisting of the latching unit can also be provided.

As disclosed by the description above, it is necessary firstly to release the latching unit from the base body if it is desired to remove the corrugated tube from the connecting assembly again. In order to be able to prevent an unintentional release, however, the latching unit is preferably inserted into the circumferential opening in such a way that no portion of the latching unit protrudes beyond the edge of the circumferential opening. In order, nevertheless, to allow a release of the latching unit from the base body, it is proposed that a release-assisting recess is provided on the latching unit, preferably on the base element of the latching unit. A releasing tool can be inserted into this release-assisting recess, for example, the tip of a screwdriver, in particular a screwdriver for slot-headed screws. Advantageously, the release-assisting recess is arranged adjoining the edge of the circumferential opening in order to be able to use the base body as a support for levering out the latching unit by means of the releasing tool. On withdrawal of the latching unit from the base body, the portions of the latching element carrier adjoining the slit of the slit ring are widened against their own elasticity, so that they can move past the corrugated tube.

It should be added that the connecting assembly can also comprise a sealing element which seals the outer circumferential surface of the corrugated tube against the inner circumferential surface of the base body. The sealing element can therefore advantageously be arranged between the outer circumferential surface of the corrugated tube and the inner circumferential surface of the base body. Advantageously, the tube portion is arranged, viewed in the introducing direction of the corrugated tube, behind the latching unit.

The sealing element can comprise, for example, a tube portion. Sealing lips can be provided on the outside and/or the inside of the tube portion. The inner sealing lips can be positioned so that at least one of them can be brought into sealing engagement with the tip portion of a crest of the corrugated tube. Furthermore, the inner sealing lips can be arranged so that even in the case of corrugated tubes with a different profile distribution (coarse and fine) and thus different spacings of successive crests, at least one sealing lip is in sealing engagement with a crest.

In this regard, it should be noted that the inner sealing lips and the outer sealing lips can be arranged offset relative to one another. This offers the advantage of being able to prevent pressing and thus an excessive tension in the material. Large tensions entail the danger of causing creep of the material which, over time, can result in leakiness of the sealing element.

Furthermore, at the end of the tube portion remote from the latching unit, a radially inwardly facing collar can be provided. This can serve as an additional end-side seal for the end of the corrugated tube. For production-related reasons, this radially inward collar can also be omitted. Lastly, at the end of the tube portion which is adjacent to the latching unit, a radially outwardly facing collar can be provided. This collar can ensure that, during the introduction of the corrugated tube, the sealing element is held in place and is not displaced from the corrugated tube in an undesirable manner. This collar also provides an additional barrier against pressurised water.

It should be added that the sealing element is produced from a rubberised elastic material, for example TPE (thermoplastic elastomer) or EPDM (ethylene propylene diene monomer) rubber.

It should also be added that the latching unit according to the invention and/or the base body can be produced from plastics material, for example PA (polyamide), in particular PA6 and/or PA12, or PP (polypropylene) or PVDF (polyvinylidene fluoride). In addition, they can be produced as injection moulded parts wherein the base body in particular can preferably be produced using an injection mould comprising two mould halves.

BRIEF DESCRIPTION OF THE DRAWINGS

The invention will now be described in greater detail with reference to an embodiment illustrated in the accompanying drawings, in which.

DETAILED DESCRIPTION

Figure 1:
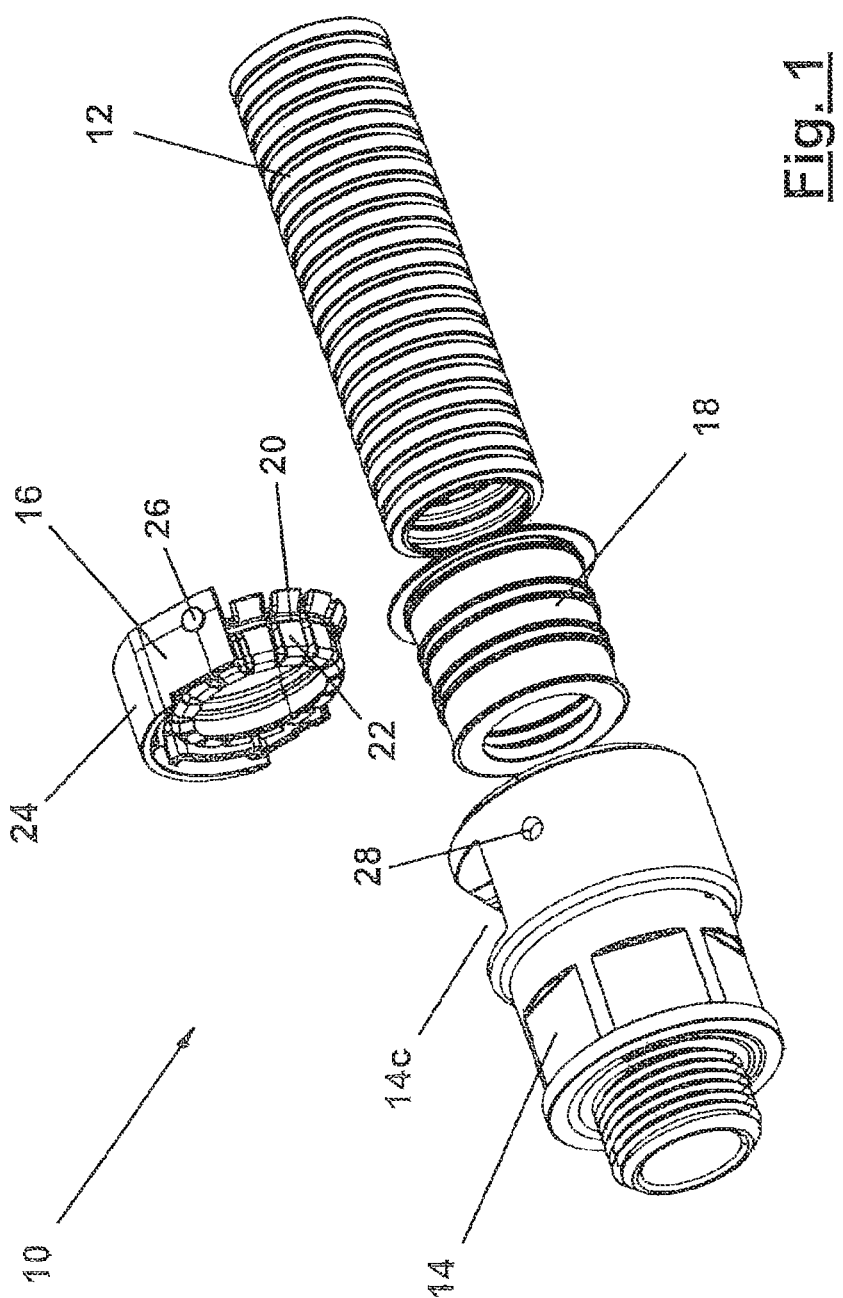
FIG. 1 is a perspective exploded view of a connecting assembly according to the invention with an associated corrugated tube.
Figure 2:
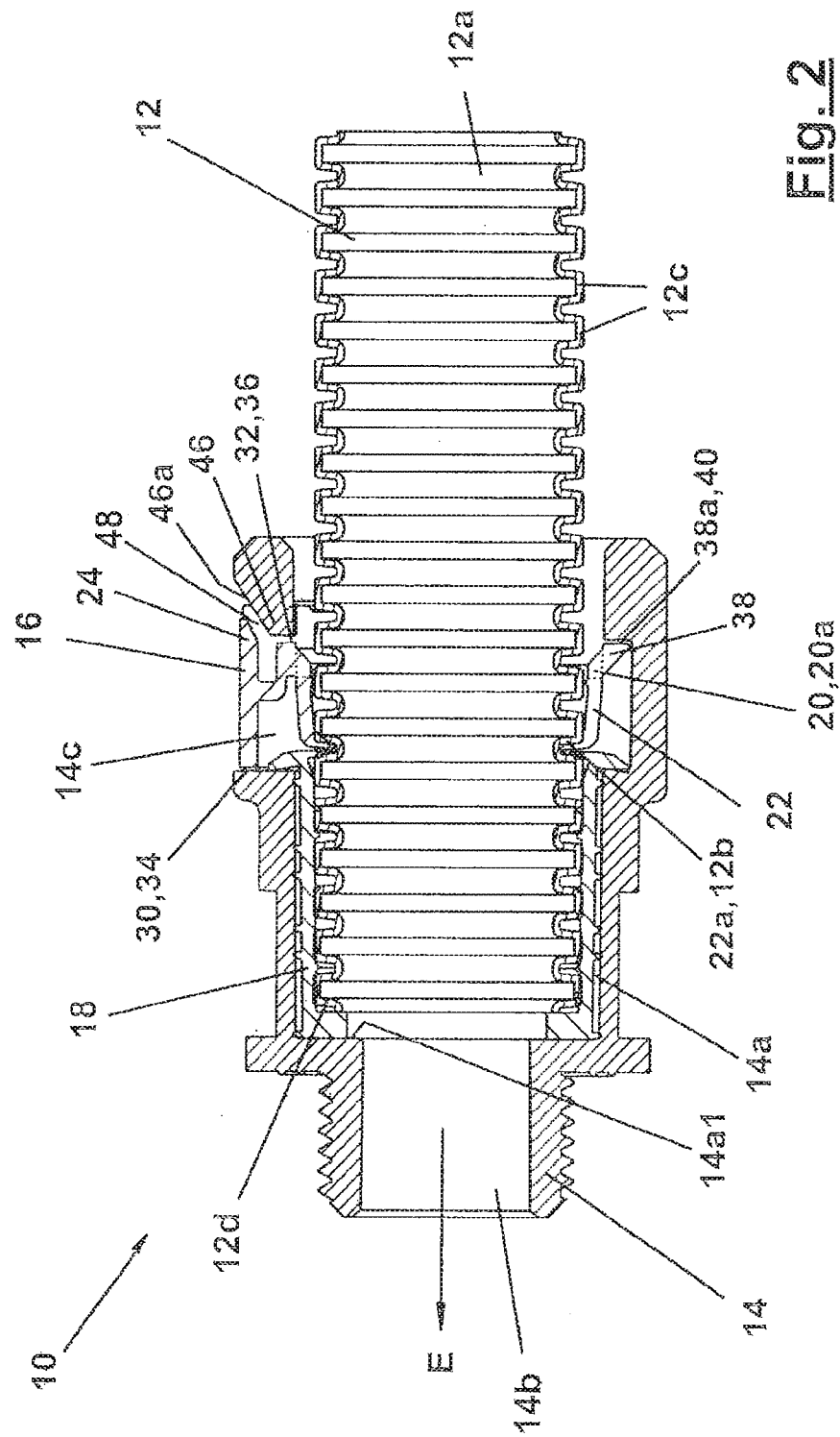
FIG. 2 is a sectional side view of the connecting assembly according to FIG. 1 with an introduced corrugated tube.

FIGS. 1 and 2 show a connecting assembly according to the invention, identified overall as 10. The connecting assembly 10 is intended for connecting to a corrugated tube 12 and, for this purpose, comprises a base body 14, a latching unit 16 and a sealing element 18. Whereas FIG. 1 shows an exploded view of the different components, FIG. 2 illustrates said components in their connected state.

The base body 14 has a receptacle recess 14a (see also FIG. 5) which serves to receive the corrugated tube 12 introduced in the introducing direction E (FIG. 2), so that in the connected state according to FIG. 2, a central passage 14b of the base body 14 is connected to a central passage 12a of the corrugated tube 12. The fluid-tight configuration of this connection is ensured by the sealing element 18 which is arranged between the inner circumferential surface of the receptacle recess 14a of the base body 14 and the outer circumferential surface of the corrugated tube 12.

In the connected state according to FIG. 2, the latching unit 16 is also inserted into a circumferential opening 14c of the base body 14 and secures the corrugated tube 12 in the receptacle recess 14a. For this purpose, the latching unit 16 comprises a latching element carrier 20 configured as a slit ring, along the circumference of which a plurality of latching elements 22 configured as barbs is arranged (see also FIG. 4). The free ends 22a of the latching elements 22 engage, in the connected state according to FIG. 2, in a trough 12b of the corrugated tube 12 and resist, in a barb-like manner, a removal of the corrugated tube 12 from the receptacle recess 14a.

The extent of the latching element carrier 20 is indicated in FIG. 2 by a dotted line. It is notable that the latching element carrier 20 does not need to be a massive component. Rather, it is only formed by a thin material web of the latching unit 16 which extends as far as the slot 20a over 360° (see also FIGS. 3 and 4).

The latching element carrier 20 is integrally connected to a base element 24 of the latching unit 16 which is configured to be mechanically robust and thus allows the handling of the latching unit 16 without the risk of damage to the latching elements 22. The base element 24 is configured to be U-shaped and comprises a base limb 24a and two side limbs 24b. In the embodiment shown, both the base limb 24a and also the two side limbs 24b are directly integrally connected to the latching element carrier 20, i.e. not only via the "detour" of another part, for example one of the other limbs of the U-shape.

Provided on each of the side limbs 24b is a securing protrusion 26 which, in the state of the latching unit 16 inserted into the circumferential opening 14c of the base body 14, engages in a securing opening 28 of the base body and so, with the corrugated tube 12 not yet introduced, secures the latching unit 16 against unintentional falling out from the base body 14.

Figure 5:
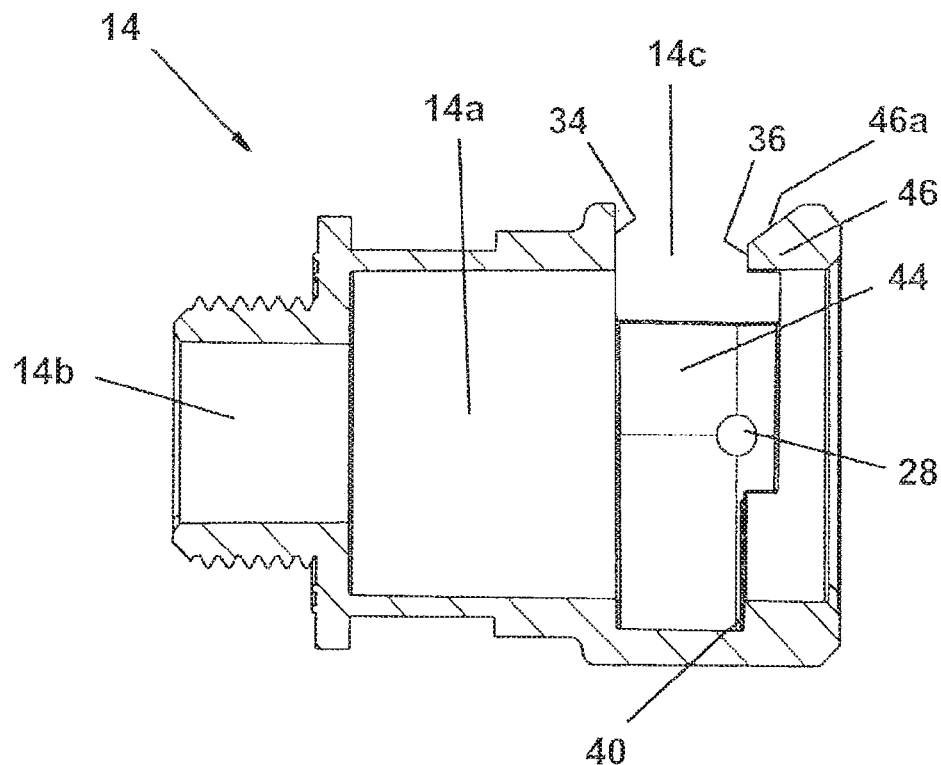
FIG. 5 is a sectional side view of the base body of the connecting assembly according to FIG. 1.

Furthermore, the surfaces 42 of the two side limbs 24b serve as guidance surfaces which, on insertion of the latching unit 16 into the circumferential opening 14c in the direction indicated by the arrow R, cooperate with associated counterguidance surfaces 44 of the base body 14 (see FIG. 5).

Furthermore, formed on the base element 24 are contact surfaces 30 and 32 which cooperate with associated countercontact surfaces 34 and 36 of the base body 14 in order to be able to transmit forces conducted in by the corrugated tube 12 via the latching elements 22 into the latching unit 16, to the base body 14. Since, due to its U-shape, the base element 24 does not extend over the whole circumference of the corrugated tube 12, contact elements 38 are provided on the latching element carrier 20 on its side facing away from the latching elements 22, the free ends 38a of said contact elements cooperating for force transmission with a countercontact surface 40 of the base body 14.

As is best shown by FIG. 2, the base body 14 has an orientation-assisting protrusion 46 which, in the connected state of the base body 14 and the latching unit 16 engages in an orientation-assisting recess 48 of the latching unit 16. By means of the cooperation of the orientation-assisting protrusion 46 with the orientation-assisting recess 48, it can be ensured that the latching unit 16 is inserted in the correct orientation, i.e. with latching elements 22 facing in the introducing direction E, into the circumferential opening 14c of the base body 14. If an attempt were made to insert the latching unit 16 into the circumferential opening 14c with latching elements 22 pointing against the introducing direction E, then the latching elements 22 would collide with the orientation-assisting protrusion 46, and therefore the insertion of the latching unit 16 into the base body 14 would be prevented. Furthermore, the cooperation of the orientation-assisting protrusion 46 with the orientation-assisting recess 48 represents a twist protection for the latching unit 16.

As is also shown in FIG. 2, the orientation-assisting protrusion 46 has an inclined surface 46a and is arranged at a spacing from the base limb 24a of the base element 24 of the latching unit 16. In the gap formed in this way by the orientation-assisting recess 48, a releasing tool, for example, the tip of a flat bladed screwdriver can be introduced. If the releasing tool is pivoted in the clockwise direction in FIG. 2 and if the orientation-assisting protrusion 46 is used as a support, then the latching unit 16 is levered somewhat out of the base body 14 by releasing the latching of the securing protrusions 26 in the securing recesses 28. Subsequently, the latching unit 16 can be grasped on the base element 24 and completely released from the base body. In this way, the orientation-assisting recess 48 simultaneously also forms a release-assisting recess. However, it is fundamentally also conceivable to provide the orientation-assisting recess and the release-assisting recess as recesses configured separately from one another.

Figure 6:
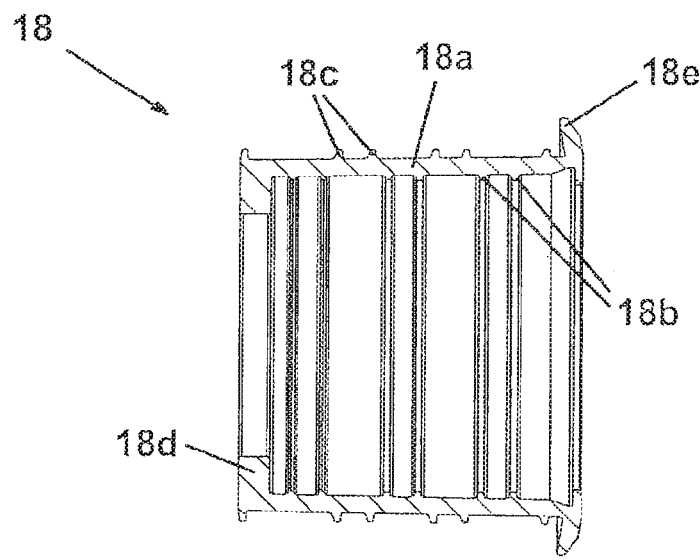
FIG. 6 is a sectional side view of the sealing element of the connecting assembly according to FIG. 1.

As shown in FIG. 2, the sealing element 18 is arranged, viewed in the introducing direction E, behind the latching unit 16. As is better recognizable in FIG. 6, the sealing element 18 is formed to be substantially tubular. In the embodiment shown, both on the outside and on the inside of the tube portion 18a, sealing lips 18b and 18c are provided. The inner sealing lips 18b can be positioned so that at least one of them can be brought into sealing engagement with the tip portion of a crest 12c of the corrugated tube 12. Furthermore, in the embodiment shown, at the end of the tube portion 18a remote from the latching unit 16, a radially inwardly facing collar 18d is provided. This can serve as an additional end-side seal for the end of the corrugated tube 12. In order to simplify the production of the sealing element 18, however, this radially inward collar 18d can also be omitted. Lastly, at the end of the tube portion 18a adjoining the latching unit 16, a radially outwardly facing collar 18e is provided. On introduction of the corrugated tube 12, this collar 18e prevents the sealing element 18 from being undesirably displaced thereby.

For the production of a state of the connecting assembly 10 prepared for the introduction of a corrugated tube 12, the sealing element 18 is initially arranged in the receptacle recess 14a until it lies against the bottom thereof 14a1. Subsequently, the latching unit 16 is introduced into the circumferential opening 14c until the securing protrusions 26 latch into the securing recesses 28.

If the corrugated tube 12 is now introduced into the connecting assembly 10, the end 12d of the corrugated tube 12 moves against the latching elements 22 and pushes the contact surface 30 of the latching unit 16 into contact with the countercontact surface 34 of the base body 14. Through the cooperation of the surfaces 30, 34, the resistance is generated which is necessary so that on further introduction of the corrugated tube 12 into the connecting assembly 10, the latching elements 22 can be elastically deflected so far that the crests 12c of the corrugated tube 12 can move past the free ends of the latching elements 22. In this case, in a circumferential portion in which the latching element carrier 20 is integrally connected to the base element 24 of the latching unit 16, the elastic deflection movement must be brought about solely by an elastic deformation of the latching elements 22, whereas they can come back together in the circumferential portions adjoining the slit 20a of the latching element carrier 20 from an elastic deformation firstly of the latching element carrier 20 and secondly from an elastic deformation of the latching elements 22. In these circumferential portions, the latching elements 22 are therefore less severely loaded. Once the corrugated tube 12 has been completely inserted into the connecting assembly 10, the free ends of the latching elements 22 pivot back under the effect of their own elasticity and engage in a trough 12b of the corrugated tube 12.

If an attempt is now made to pull the corrugated tube 12 back out of the connecting assembly 10, then the latching elements 22 are impinged upon such that they engage more strongly into the trough 12b of the corrugated tube 12. At the same time, the contact surface 32 of the latching unit 16 comes into engagement with the associated countercontact surface 36 of the base body 14. In this way, a non-destructive release of the corrugated tube 12 from the connecting assembly 10 is prevented.

If it is desired to remove the corrugated tube 12 from the connecting assembly 10 again, it is necessary firstly to release the latching unit 16 from the base body 14. As described above, the latching unit 16 is levered with the aid of a releasing tool so far out of the circumferential opening 14c of the base body that the latching unit 16 can be grasped on its base element 24 and completely pulled out of the circumferential opening 14c. The portions of the latching element carrier 22 adjoining the slit 20a are widened against their own elasticity, so that they can move past the corrugated tube 22.

Figure 3:
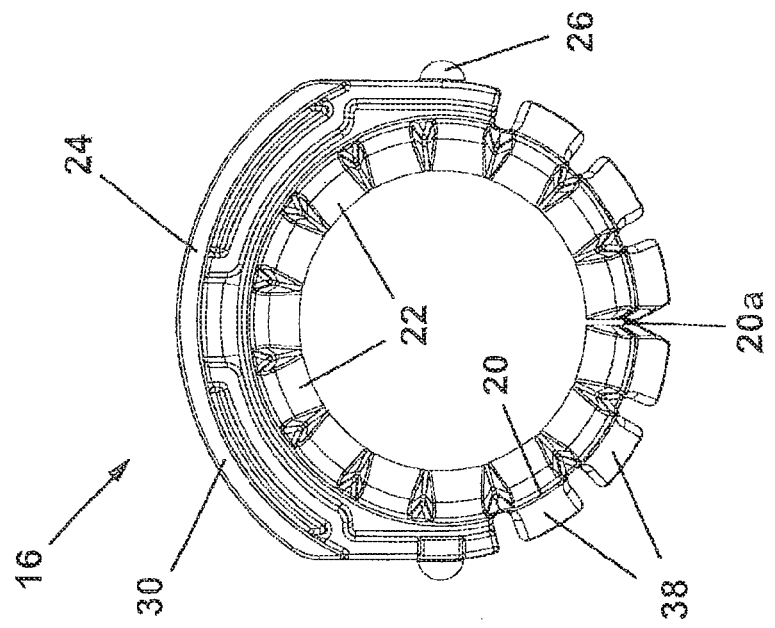
FIG. 3 is a view of the latching unit viewed in the introducing direction.

It should also be mentioned that the latching elements 22 are arranged along the circumference of the latching element carrier 20 in a substantially gapless sequence, i.e. substantially without spacing from one another. This has the advantage that the latching elements 22 form a deflector wall for water that is ejected, for example, from a high pressure cleaning device and impacts with force against the connecting assembly 10. In order to be able to improve this deflector wall effect further, the latching elements 22—with the exception of the latching elements 22' directly adjoining the slit 20a—are connected to one another, in the newly produced state, by means of plastics membranes 50. In the illustration of FIG. 3, these plastics membranes 50 together with the surfaces of the latching elements 22 form an annular surface that is continuous except for the slit 20a. The separation points of the latching elements 22 are evident merely as small notches 52. On expansion of the latching elements 22 as a result of the introduction of the corrugated tube 12, not all the membranes 50 must necessarily tear. Particularly in the portions adjacent to the slit 20a, the latching elements 22 need to expand less severely on introduction of the corrugated tube 12, since here the latching element carrier 20 also moves elastically out of the way of the introduced corrugated tube 12. The connections formed by the untorn plastics membranes 50 between mutually adjacent latching elements 22 improve the deflector wall effect which impedes the penetration of water.

Figure 7:
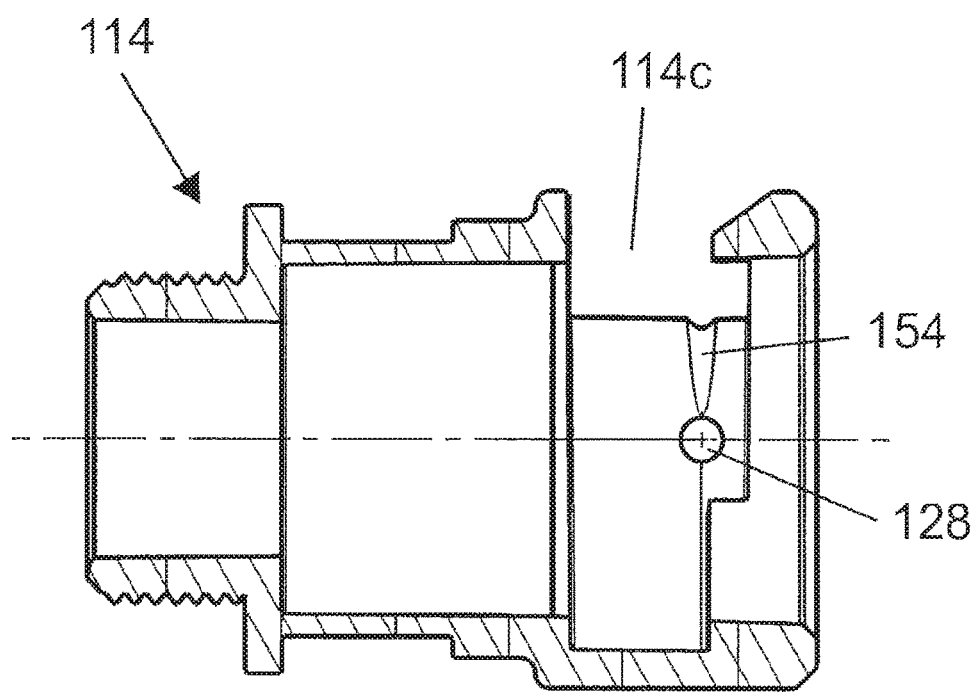
FIG. 7 is a sectional side view of a further embodiment of the base body of the connecting assembly.

The embodiment of the base body 114 shown in FIG. 7 differs from the embodiment of the base body 14 shown in FIGS. 1 and 5 in particular through the guidance surface 154. Therefore, in FIG. 7, similar parts are provided with the same reference signs as in FIGS. 1 and 5, though increased by the number 100. The base body 114 according to FIG. 7 is therefore only described below to the extent that it differs from the embodiment according to FIGS. 1 and 5, wherein otherwise reference is made exclusively to the description of the embodiment according to FIGS. 1 and 5.

FIG. 7 has a guidance surface 154 which is configured to be substantially V-shaped and extends in a tapered manner from a circumferential opening 114c toward a securing recess 128. The guidance surface 154 has a depth which decreases from the opening of the V-shape to the tip of the V-shape.

Figure 4:
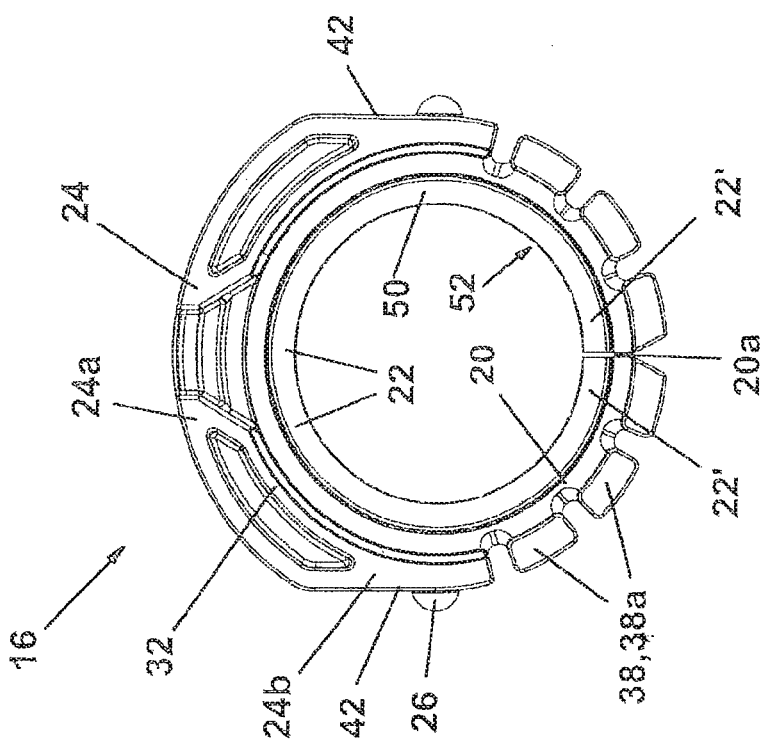
FIG. 4 is a view of the latching unit viewed against the introducing direction.

The cross section of the V-shaped guidance surface 154 is adapted to the hemispherical form of the securing elements 26 shown according to the embodiment from FIGS. 3 and 4.

At this point, it should be added that, in the cross section of the base body 114 shown in FIG. 7, only one guidance surface 154 is shown. In conformity with the embodiment of the latching unit 16, e.g. according to FIGS. 3 and 4, which comprises two securing protrusions 26, the base body 114 also has two securing recesses 126 and two associated guidance surfaces 154.

In this way, the two securing protrusions 26 of the latching unit 16 according to the embodiment of e.g. FIGS. 3 and 4, are guided from the first moment of coming into engagement with the base body 114, along both of the guidance surfaces 154 until they come into engagement with the two securing recesses 126.

The invention claimed is:

1. A connecting assembly which is configured and intended for connecting to one end of a corrugated tube, the connecting assembly comprising:
   a base body with a central passage which opens into a receptacle recess provided at one end of the base body, wherein the receptacle recess is configured to receive the corrugated tube which is introducible along an introducing direction, and
   a latching unit which is insertable through a circumferential opening of the base body into the receptacle recess and which comprises a latching element carrier and a plurality of latching elements constructed as one piece with the latching element carrier,
   wherein the latching elements are configured and intended to engage in a trough of the corrugated tube and to resist a movement of the corrugated tube out of the receptacle against the introducing direction,
   wherein the latching element carrier is configured as a slit ring and in that the latching elements are arranged evenly distributed along the circumference of the latching element carrier, and
   wherein the latching elements are arranged along the circumference of the latching element carrier in a substantially gapless sequence.

2. The connecting assembly according to claim 1, wherein, with the exception of the latching elements arranged on either side of the slit of the latching element carrier, mutually adjacent latching elements are connected to one another by means of a membrane.

3. The connecting assembly according claim 2, wherein the latching unit comprises at least one securing element which can be brought into a securing engagement with an associated countersecuring element of the base body securing the latching unit to the base body.

4. The connecting assembly according to claim 1, wherein the latching unit comprises at least one securing element which can be brought into a securing engagement with an associated countersecuring element of the base body securing the latching unit to the base body.

5. The connecting assembly according to claim 4, wherein the at least one securing element is configured as a securing protrusion, whereas the countersecuring element is configured as a securing recess, preferably as a securing opening penetrating the circumferential wall of the base body.

6. The connecting assembly according to claim 1, wherein the latching unit comprises a base element which is integrally connected to the latching element carrier.

7. The connecting assembly according to claim 6, wherein the base element comprises at least one guidance surface and in that the base body comprises at least one counterguidance surface which, at the start of the introduction of the latching unit into the base body can be brought into guiding engagement with one another.

8. The connecting assembly according to claim 6, wherein the base element comprises at least one contact surface facing in the introducing direction and/or at least one contact surface facing against the introducing direction, which can each be brought into force-transmitting engagement with an associated countercontact surface of the base body.

9. The connecting assembly according to claim 6, wherein the base element is configured to be U-shaped.

10. The connecting assembly according to claim 9, wherein a base limb and at least one of side limbs of the U-shape are directly integrally connected to the latching element carrier.

11. The connecting assembly according to claim 9, wherein at least one securing element of the latching unit is arranged on one of the side limbs of the U-shape.

12. The connecting assembly according to claim 1, wherein, in the portions of the latching element carrier adjoining the slit of the latching element carrier on the side of the latching element carrier facing away from the latching elements, a plurality of contact elements facing against the introducing direction are provided which can be brought into force-transmitting engagement with an associated countercontact surface of the base body.

13. The connecting assembly according to claim 1, wherein provided on the base body is an orientation-assisting protrusion which protrudes into the circumferential opening, whilst on the latching unit, an associated orientation-assisting recess is provided.

14. The connecting assembly according to claim 1, wherein a release-assisting recess is provided on the latching unit.

15. The connecting assembly according to claim 1, wherein it also comprises a sealing element.

16. The connecting assembly according to claim 1, wherein, with the exception of the latching elements arranged on either side of the slit of the latching element carrier, mutually adjacent latching elements are connected to one another by means of a membrane.

17. The connecting assembly according claim 1, wherein the latching unit comprises at least one securing element which can be brought into a securing engagement with an associated countersecuring element of the base body securing the latching unit to the base body.

18. A connecting assembly which is configured and intended for connecting to one end of a corrugated tube, the connecting assembly comprising:
   a base body with a central passage which opens into a receptacle recess provided at one end of the base body, wherein the receptacle recess is configured to receive the corrugated tube which is introducible along an introducing direction, and
   a latching unit which is insertable through a circumferential opening of the base body into the receptacle recess and which comprises a latching element carrier and a plurality of latching elements constructed as one piece with the latching element carrier, wherein the latching elements are configured and intended to engage in a trough of the corrugated tube and to resist a movement of the corrugated tube out of the receptacle against the introducing direction, wherein the latching element carrier is configured as a slit ring and in that the latching elements are arranged evenly distributed along the circumference of the latching element carrier, and wherein, in the portions of the latching element carrier adjoining the slit of the latching element carrier on the side of the latching element carrier facing away from the latching elements, a plurality of contact elements facing against the introducing direction are provided which can be brought into force-transmitting engagement with an associated countercontact surface of the base body.

19. A connecting assembly which is configured and intended for connecting to one end of a corrugated tube, the connecting assembly comprising:

a base body with a central passage which opens into a receptacle recess provided at one end of the base body, wherein the receptacle recess is configured to receive the corrugated tube which is introducible along an introducing direction, and a latching unit which is insertable through a circumferential opening of the base body into the receptacle recess and which comprises a latching element carrier and a plurality of latching elements constructed as one piece with the latching element carrier, wherein the latching elements are configured and intended to engage in a trough of the corrugated tube and to resist a movement of the corrugated tube out of the receptacle against the introducing direction, wherein the latching element carrier is configured as a slit ring and in that the latching elements are arranged evenly distributed along the circumference of the latching element carrier, and wherein provided on the base body is an orientation-assisting protrusion which protrudes into the circumferential opening, whilst on the latching unit, an associated orientation-assisting recess is provided.

\* \* \* \* \*